April 3, 1956   M. A. WALDEN   2,740,305
TRANSMISSION ACTUATING AND CONTROLLING MECHANISMS
Original Filed Jan. 15, 1949   2 Sheets-Sheet 1
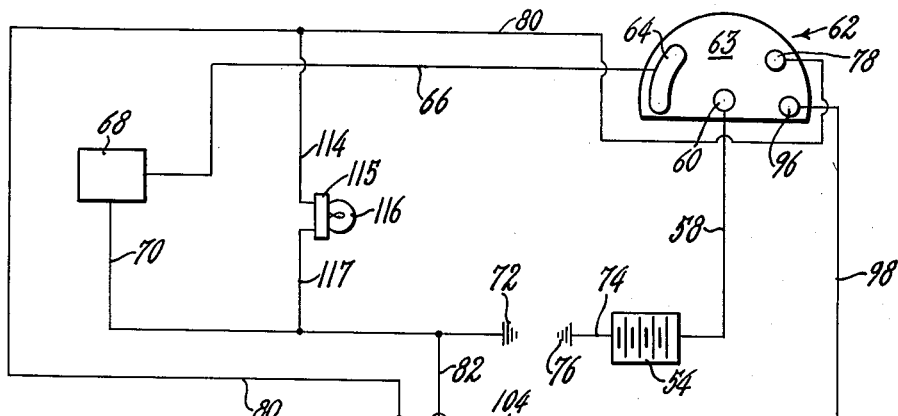
FIG. 1
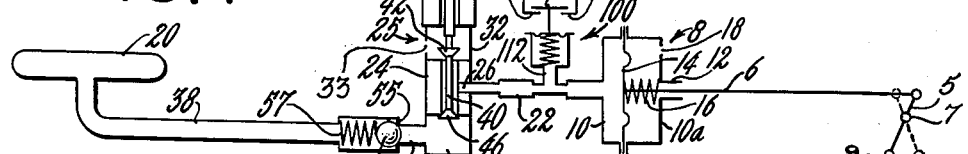
FIG.7   FIG.6   FIG.5
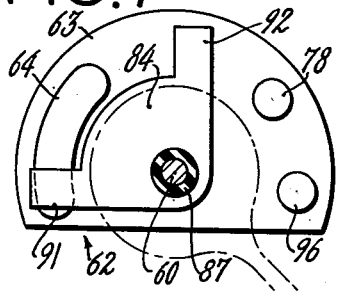
FIG.2
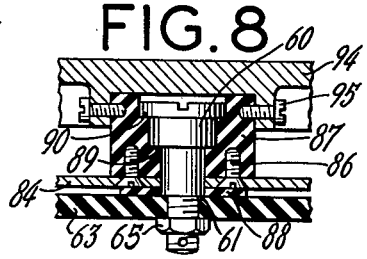
FIG.3
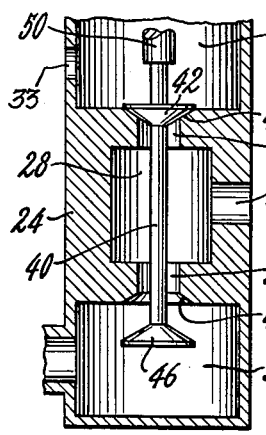
FIG.8
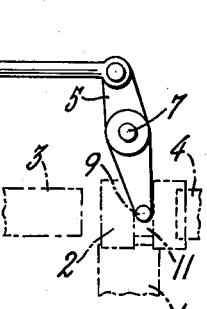
Inventor
MYRICK A. WALDEN
By Chauncey M.
Sinterbeaux
Attorney

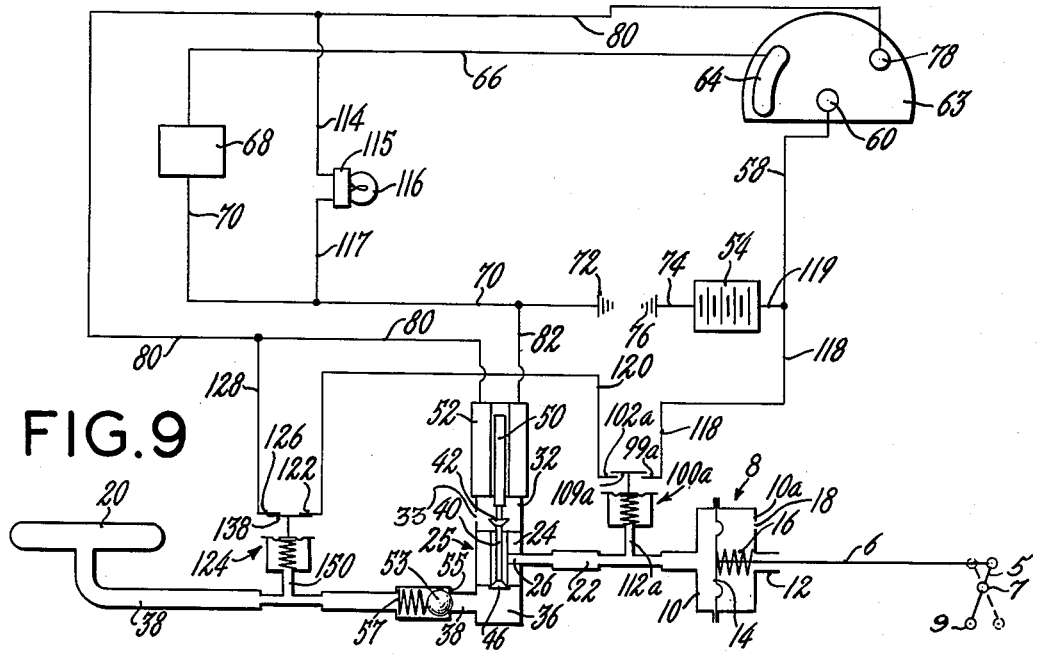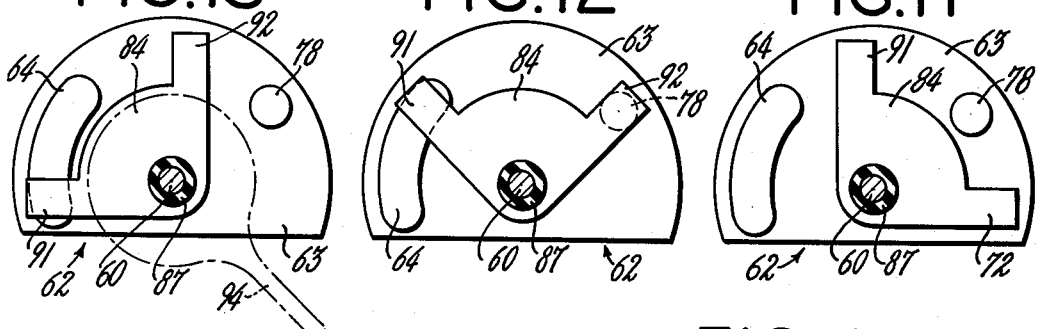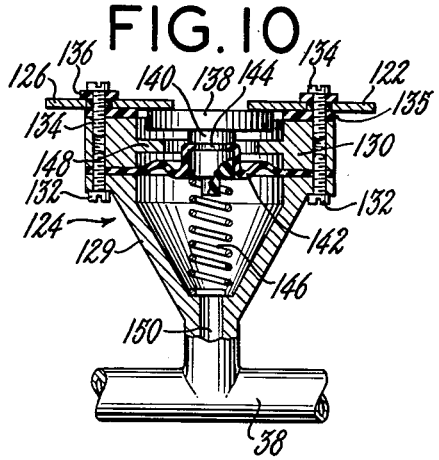

United States Patent Office 2,740,305
Patented Apr. 3, 1956

2,740,305

TRANSMISSION ACTUATING AND CONTROLLING MECHANISMS

Myrick A. Walden, East Haddam, Conn.

Continuation of application Serial No. 71,156, January 15, 1949. This application November 19, 1952, Serial No. 321,431

26 Claims. (Cl. 74—472)

This invention relates to a transmission actuating and controlling mechanism for motor vehicles.

This application is a continuation of applicant's pending application Serial No. 71,156 filed January 15, 1949, now abandoned, for Transmission Actuating and Controlling Mechanisms.

The invention is particularly intended as an improvement in transmission actuating and controlling mechanisms for motor vehicles having two speed rear axle transmissions and power operated means for shifting the transmission to disconnect the rear axle from the driving mechanism for driving the axle at one speed and to connect said axle with the driving mechanism for driving the axle at another speed and is shown as applied to such a transmission. It is to be understood, however, that the invention is not limited in its application to a two speed rear axle transmission but that certain features thereof have other applications.

Certain objects of the invention are to improve the construction and mode of operation of transmission actuating and controlling mechanisms for motor vehicles and to provide a novel mechanism for actuating and controlling a transmission to cause shifts from one gear ratio to another in accordance with variations in manifold pressure.

Mechanisms have been produced in which the gear shift mechanism of the transmission has been shifted by mechanism operated and controlled by differential fluid pressures. The present invention relates more particularly to a gear shift operating mechanism of this type. In the mechanisms heretofore produced having fluid pressure controlled mechanism for shifting the transmission from one speed to another, of which applicant is aware, the means for rendering the fluid pressure mechanism operative to effect the shift of the transmission has been operated independently of the means for connecting and disconnecting the ignition circuit and has required separate attention on the part of the operator. Another object of the invention is to enable the operator more conveniently and efficiently to connect and disconnect the ignition circuit and to control the fluid pressure mechanism to effect the desired shifts in the gearing.

To this end, a feature of the present invention consists in a single controller for controlling the ignition circuit and the fluid pressure mechanism in the proper relation and/or sequence.

In transmission mechanisms in which the gears are relatively shifted in one direction by mechanism operated by differential fluid pressures and in the opposite direction by a spring, a careless operator may disconnect the ignition circuit when the vehicle is still in the gear into which it is moved by the fluid pressure mechanism, and leave the vehicle parked in this condition without engaging the emergency brake. The fluid pressure condition which produced the shift is then dissipated through leakage and the spring shifts the gearing into neutral. If the vehicle is parked on a grade when this occurs, as is frequently the case, the vehicle will start rolling down the grade. A similar condition may result from the stalling of the motor when the transmission is in the gear into which it is moved by the mechanism which is operated by the differential fluid pressures.

Another object of the invention is to produce an improved transmission operating and controlling mechanism of the class or type above described which is highly practical and efficient and in which it is impossible for the operator to park the car with the gearing of the transmission in the condition in which it is placed by the differential fluid pressure operated mechanism in opposition to the action of the spring.

Another object of the invention is to produce an improved transmission actuating and controlling mechanism for motor vehicles in which the transmission is automatically shifted into low gear upon the stopping of the engine with the high speed gearing of the transmission connected with the rear axle or other driving shaft.

With the above and other objects in view, the invention consists in a mechanism embodying the novel and improved features, constructions and combinations of parts hereinafter described and particularly pointed out in the claims, the advantages of which will be understood and appreciated by those skilled in the art.

The invention will be clearly understood from the accompanying drawings illustrating constructions embodying the several features of the invention in their preferred forms and the following detailed description of the constructions therein shown.

In the drawings:

Fig. 1 is a diagrammatic view illustrating a transmission actuating and controlling mechanism embodying certain features of the invention and also illustrating an improved electrical system for controlling the ignition circuit and the shift of the gearing.

Fig. 2 is a detail view in vertical section illustrating a valve construction for controlling the connection of the differential fluid pressure operated and controlled mechanism with the engine manifold and with the atmosphere.

Fig. 3 is a view in vertical section illustrating a differential fluid pressure controlled mechanism for operating the gear shift lever to shift the gearing.

Fig. 4 is a view in vertical section illustrating a differential fluid pressure controlled switch embodied in the system shown in Fig. 1.

Fig. 5 is a plan view illustrating a controller for the electrical system shown in Fig. 1 including a movable switch member with said switch member in neutral or parking position.

Fig. 6 is a view similar to Fig. 5, showing the controller with the movable switch member in low gear position.

Fig. 7 is a view similar to Fig. 5 illustrating the controller with the movable switch member in high gear position.

Fig. 8 is a detail sectional view of the controller taken in a plane containing the axis of the movable switch member.

Fig. 9 is a diagrammatic view similar to Fig. 1 illustrating a transmission actuating and controlling mechanism and an electrical system for controlling the ignition circuit and the shift of the gearing embodying certain features of the invention in modified form.

Fig. 10 is a view in vertical section illustrating another differential fluid pressure controlled switch employed in the system shown in Fig. 9.

Fig. 11 is a view illustrating a controller including a movable switch member for the system shown in Fig. 9 with the movable switch member in neutral position.

Fig. 12 is a view similar to Fig. 11 illustrating the controller with the movable switch member in low gear position.

Fig. 13 is a view similar to Fig. 11 showing the controller with the movable switch member in high gear position.

The transmission mechanism may be one of the conventional types and is not shown in detail in this application. For example, the transmission may have substantially the construction of the "Timken Two-Speed Double Reduction Axle" transmission shown and described on page 958 of the publication entitled "Dyke's Automobile and Gasoline Engine Encyclopedia" twentieth edition (1943) or substantially the construction of the "Eaton Two-Speed or Dual Ratio Rear Axle" transmission mechanism shown and described on pages 957 and 958 of said publication. Or the transmission may be constructed in accordance with the disclosure in the patent to Price, No. 2,373,259. The diagrammatical illustration of the transmission in this application corresponds to the disclosure in the Price patent.

In the construction shown in the drawings, the two-speed driving mechanism for the rear axle comprises a driving gear 1 driven by the propeller shaft with which a gear is engaged a laterally or axially shiftable driving gear 2. The gear 2 is interposed between the gears 3 and 4 axially aligned therewith and is formed at its opposite ends with internal clutch elements or splines arranged respectively to be engaged with corresponding elements on the gears 3 and 4 by the lateral movement of gear 2 to clutch the latter gear alternatively to the gears 3 and 4. The gear 3 constitutes one element of a gear train for driving the rear axle at relatively low speed and the gear 4 constitutes one element of a gear train for driving the rear axle at relatively high speed.

The gear 2 is shifted into engagement with the gear 4 to set the transmission for driving the rear axle at high speed and into engagement with the gear 3 to set the transmission to drive the rear axle at low speed by mechanism comprising gear shift lever 5 pivoted at 7 on the frame of the vehicle and having, at its lower end, a yoke embracing the gear 2 and carrying rolls 9 engaging in a groove 11 in said gear. The lever 5 is actiuated from a differential pressure operated mechanism through a longitudinally movable rod 6 to which the upper arm of the lever is pivoted.

In the preferred form of the invention illustrated in this application, the power mechanism for operating the gear shift mechanism of the transmission to shift from one speed to another is operated and controlled by the reduction of the pressure in certain parts of the mechanism below atmospheric pressure and the restoration of the pressure in these parts substantially to atmospheric pressure. This power mechanism is termed herein "vacuum mechanism" or "vacuum operated mechanism." Certain switches employed in the present electrical system are similarly controlled and these are termed herein "vacuum operated" or "vacuum controlled" switches.

The vacuum mechanism for moving the rod 6 comprises a casing made in two parts or sections 10—10ᵃ having peripheral flanges which are secured together by bolts 11. The section 10 is provided with a bearing 12 through which the rod 6 passes. Within the casing is located a flexible diaphragm 14, the margin of which is clamped between the peripheral flanges on the two section 10 and 10ᵃ of the casing. To the central portion of the diaphragm 14 is attached the end of the rod 6 opposite the lever 5 and the diaphragm is acted upon by a tension spring 16 connected at its ends respectively with the central portion of the diaphragm and the opposed portion of the section 10ᵃ of the casing. When the diaphragm is not under the influence of the vacuum mechanism, the spring 16 operates to move the rod 6 to shift the transmission to connect the low speed gearing with the driving shaft. The section 10ᵃ of the casing is provided with one or more openings 18 to allow the free passage of air into and out of the space between this section of the casing and the diaphragm 14.

The chamber in the section 10 of the casing 10—10ᵃ is connected by suitable conduits with the manifold 20 of an internal combustion engine by which the motor vehicle is driven. One of these conduits indicated at 22 is connected at one end with the section 10 of the casing 10—10ᵃ and at the other with a valve casing 24 of a valve indicated as a whole at 25. Within the valve casing 24 is mounted a shiftable valve member for controlling the connection of the chamber within the section 10 of the casing 10—10ᵃ with the engine manifold.

The valve casing 24 is formed with a passage 26 connected with the conduit 22 and leading to a valve chamber 28 in said casing.

The valve casing 24 is formed at its upper end with a passage 30 leading from the chamber 28 to a chamber 32, the walls of which are supported upon the upper end of the valve casing. The walls of said chamber are formed with one or more openings 33 through which air may pass freely at all times into and out of the chamber. The valve casing is formed at its lower end with a passage 34 leading from the valve chamber 28 to a chamber 36, the walls of which are connected with the lower end of the valve casing. This chamber is connected by a conduit 38 with the engine manifold 20.

Mounted centrally in the valve casing 24 is a shiftable valve member consisting of a rod 40 arranged to move vertically therein. This valve member carries, at its upper end, a conical valve 42 arranged to engage a valve seat 44 on the upper part of the casing 24 to close the passage 30. The valve member carries, at its lower end, a conical valve 46 arranged to engage a valve seat 48 formed on the lower part of the casing to close the passage 34.

The shiftable valve member 40, when lifted to a position to engage the valve 46 with the valve seat 48, cuts off communication between the engine manifold and the casing element 10 of the vacuum mechanism and opens the valve chamber 28 to communication with the atmosphere through the chamber 32. When the valve member 40 is in its lower position with the valve 42 in engagement with the valve seat 44, communication is established between the engine manifold and the casing member 10 and said chamber 28 is cut off from communication with the chamber 32.

When the engine is out of operation, the valve member 40 is held in lowered position by gravitational action, the passage 30 is closed by the valve 42 and the passage 34 is open. Since the engine is not running, there is no vacuum in the casing section 10 and the rod 6 is acted upon by the spring 16 to hold the gear shift lever 5 in position to connect the low speed driving gearing of the transmission with the rear axle or other shaft. Upon starting the engine, the valve 40 is moved into its upper position, the passage 34 is closed by the valve 46 and the passage 30 is opened. The valve chamber 28 will therefore be cut off from the intake manifold and will be put into communication with the atmosphere through the passage 30. There will then still be no vacuum produced in the casing element 10 and the gear shift mechanism of the transmission will be maintained, by the spring 16, in position to connect the low speed driving mechanism with the axle. When the vehicle has been well started, the controlling mechanism is actuated to allow the valve member to be again depressed by gravity to its lower position. This closes the passage 30 and opens the passage 34 to establish communication between the valve chamber 28 and the casing element 10 and the intake manifold 20 of the engine. The diaphragm 14 then is actuated aaginst the tension of the spring 16 to move the rod 6 and the shift lever 5 to shift the transmission to connect the high speed driving mechanism with the axle.

In the present form of the invention, the position of the valve member 40 is controlled by means of a suitable solenoid connected with the same. This solenoid comprises a core 50 arranged within a series of coils 52 and connected with the upper end of the valve rod 40, the coils of the solenoid being located within a suitable shell resting upon and secured to the upper end of the chamber 32.

In the system shown in Fig. 1, a check valve is preferably provided between the engine manifold and valve 25.

This check valve comprises a ball 53 mounted in the conduit 38 and arranged to engage a seat 55 formed on the inside of said conduit. The ball 53 is acted upon by a compression spring 57 which normally maintains the ball in engagement with the valve seat and thereby prevents any substantial flow of pressure from the engine manifold into and through the valve 25 whenever the vacuum in the manifold falls below that in the casing 10.

The electrical system for the machine comprises a suitable source of electrical energy such as a battery 54 and circuit connections from the battery to the ignition system and to the solenoid 50-52. The circuit connections for the ignition system comprise a conductor 58 leading from one terminal of the battery to one terminal 60 of a controller or switch mechanism indicated generally at 62. The terminal 60 consists of a stud mounted in a suitable opening in a semi-circular supporting plate 63 of insulating material fixed to a stationary support on the frame of the vehicle. The stud 60 is provided with a shoulder 61 arranged to engage the plate 63 and the stud is secured in the plate by means of a nut 65. Said switch mechanism comprises a contact 64 of elongated form mounted on the plate 63 to which contact is connected one end of a conductor 66, the other end of which is connected with one terminal of the ignition system of the vehicle indicated diagrammatically at 68. To the opposite terminal of the ignition system is connected one end of a conductor 70, the other end of which is grounded at 72. To the other terminal of the battery is connected a conductor 74 which is grounded at 76.

The controller 62 is provided with a second contact 78 mounted on the plate 63 to which contact is connected one end of a conductor 80. The other end of the conductor 80 is connected to one terminal of the coils of the solenoid 50—52. To the other terminal of the coils of the solenoid is connected one end of a conductor 82, the other end of which is connected with the conductor 70.

The controller switch is provided with a movable switch member 84 (see Figs. 5, 6 and 7) made of conducting material and pivoted on the terminal stud 60, the switch member having electrical contact with said stud. The switch member is secured by means of screws 86 to the under side of a sleeve 87 of insulating material pivoted on the terminal stud 60, the lower face of the switch member engaging a thin washer 88 of insulating material. The sleeve 87 is held in position on the stud by the shoulder 89 and the head 90 on the stud which engage a correspondingly shouldered construction on the sleeve. The switch member 84 is shifted manually to its different positions by means of a lever 94 fitted over the upper end of the sleeve 87 and secured to the sleeve by screws 95. The member 84 has the form or outline shown in Figs. 5, 6 and 7 and is shown in section in Fig. 8. Said member is formed with a sector shaped body provided with projecting portions or fingers 91 and 92 arranged to engage the contacts 64 and 78 respectively. The member 84 is flexible in directions transverse to the plane thereof and is so formed that the projections 91 and 92 are pressed yieldingly toward the insulating plate 63 by the spring of the metal and constantly are held yieldingly in engagement either with said plate or with the contacts mounted thereon. The contacts 64 and 78 are preferably mounted on the plate 63 so that they extend slightly beyond the surface of the plate adjacent the movable switch member and are rounded or inclined at their margins in the lines or paths of movement of the respective projections 91 and 92 to enable said projections readily to slide up on said contacts.

When the engine is at rest, the movable switch member 84 occupies the position shown in Fig. 5 with the projections 91 and 92 out of engagement with the contacts 64 and 78 so that both the ignition circuit and the solenoid circuit above described are disconnected at the switch and the valve member 40 is in lowered position. In starting the engine, the movable switch member is swung from the position shown in Fig. 5 to the position shown in Fig. 6. This movement of the switch member engages the projection 91 with the contact 64 and the projection 92 with the contact 78. With the switch member in this position, a circuit is made from the battery through the conductor 58, the terminal 60, the switch member 84, contact 64, conductor 66, ignition system 68 and conductors 70 and 74 back to the battery. A circuit is also established from the switch member 84 through the contacts 78, the conductor 80 to the coils of the solenoid 50—52 and from the coils of said solenoid through the conductor 82 to the conductor 70.

The shift of the movable switch member into the position shown in Fig. 6 therefore renders the ignition system operative and causes the energization of the solenoid to shift the valve member 40 to its upper position and thereby cut off communication between the conduit 22 and the conduit 38 leading to the engine manifold and to allow air under atmospheric pressure to enter the conduit 22 through the valve 25. The spring 16 will therefore maintain the rod 6 and the lever 5 in low gear positions.

In shifting to high gear the movable switch member 84 is moved from the position shown in Fig. 6 to the position shown in Fig. 7. When the switch member is shifted into the position shown in Fig. 7, the projection 92 is disengaged from the contact 78 but the projection 91 is maintained in engagement with the contact 64. Therefore with the switch member in the position shown in Fig. 7, the circuit from the terminal 60 through the solenoid is broken but the circuit from said terminal through the ignition system is maintained.

With the movable switch member in the position shown in Fig. 7, the ignition system is maintained in operating condition and the solenoid is deenergized allowing the core of the solenoid and the valve member 40 to be depressed to their lower positions by the action of gravtiy. In this position of the valve, the conduit 22 is connected with the conduit 38 leading to the manifold and the passage of atmospheric air into the conduit 22 is prevented.

With the parts in this condition, the diaphragm 14 is caused, by the relatively low pressure or vacuum condition developed in the casing member 10, to move to the left, Fig. 1, and the rod 6 and the lever 5 are actuated to shift the gearing mechanism into high gear.

In shifting from high to low gear, the movable switch member 84 is moved from the position shown in Fig. 7 to the position shown in Fig. 6 to energize the solenoid 50—52. This disconnects the casing member 10 from the engine manifold and allows air to enter the control valve through the opening 33. The tension spring 16 will then actuate the rod 6 and the lever 5 to shift the gearing mechanism into low gear.

In stopping the engine, the movable switch member 84 is shifted either from the position shown in Fig. 7 or from the position shown in Fig. 6 to the position shown in Fig. 5. The shift of said member into the position shown in Fig. 5 disconnects the ignition circuit to stop the engine and also disconnects the solenoid circuit from the contact 78.

When the shift from high gear to low gear and from low gear to ignition cut-off condition is properly made, the switch member 84 is shifted from the position shown in Fig. 7 to the position shown in Fig. 6, is allowed to dwell momentarily in the latter position and then is shifted to the position shown in Fig. 5. The dwell in the position shown in Fig. 6 will allow the transmission to be shifted to connect the low speed mechanism with the rear axle before the ignition circuit is disconnected to stop the engine. It sometimes happens, however, that a careless operator will shift his control switch rapidly without a pause from high speed driving position in which the high speed gearing is connected with the rear axle to ignition cut off position thereby stopping the engine without giving time for the gearing to be shifted automatically to connect the low speed gearing with the rear axle, and then will park the vehicle with the high speed gearing still connected with the rear axle. With the vehicle parked with the high speed gearing connected with the rear axle, the vacuum in the casing 10 will gradually be dissipated through leakage allowing the spring 16 to shift the rod 6 and shift lever 5 to shift the gearing into neutral. When the vehicle is on a grade as is very frequently the case, it will start rolling down the grade.

The present machine is provided with mechanism which will cause the shifting of the gearing into low speed, no matter how rapidly the control switch member 84 is shifted from the position shown in Fig. 7 to the position shown in Fig. 5. This mechanism comprises a contact 96 mounted on the plate 93 and arranged to be engaged by the projection 92 on the switch lever 84 and a conductor 98 connecting said contact with one terminal 99 of a vacuum controlled switch indicated as a whole at 100. The other terminal 102 of said switch is connected by means of a conductor 104 with the conductor 80. This switch is shown diagrammatically in Fig. 1 and the construction thereof is shown in Fig. 4. The contacts 99 and 102 of the switch 100 consist of plates of suitable conducting material such as copper and are mounted in spaced relation on the upper end of a conical chamber or casing 105, the contacts resting upon a ring 105$^b$ of insulating material. Said contacts are secured to said chamber by screws 106 passing through suitable openings in the contacts and in the ring 105$^b$ and threaded into a flange 107 extending outwardly from the chamber 105, the screws being separated from the contacts by insulating material indicated at 108.

The switch 100 comprises a shiftable contact element 109 located above the contacts 99 and 102 for connecting said contacts. This element is supported on the upper end of a spindle 110 to which is fixed the central part of a flexible diaphragm 111 of insulating material, the inner margin of the diaphragm engaging in a groove between an enlargement 110$^b$ on the spindle and the contact member 109. The outer margin of the diaphragm is interposed between the flange 107 on the casing and the ring 105$^b$ and is secured to said flange by the screws 106. The casing 105 is connected by a conduit 112 with the conduit 22. The diaphragm 111 is acted upon by a compression spring 113 interposed between the enlargement on the spindle 110 and the lower end of the casing which tends to force the diaphragm upwardly and normally maintains the contact member 109 out of engagement with the contacts 99 and 102 of the switch. The strength of this spring, however, is such that the diaphragm is depressed by the pressure on the upper side thereof to engage the contact element 109 with the contacts 99 and 102 of the switch when the engine is running and the conduit 22 is connected by the valve 25 with the conduit 38 leading to the engine manifold to create a vacuum in the casing 105.

With this construction, when the ignition circuit is disconnected by the rapid movement of the switch member 84 from the position shown in Fig. 7 to the position shown in Fig. 5 to stop the engine while the high speed mechanism of the transmission is connected with the rear axle, the contact 96 is engaged by the projection 92 on the switch member 84 when in the latter position. Under this condition a circuit is made from the battery through the conductor 58, the terminal 60, the switch member 84, the contact 96, the conductor 98 to the erminal 99 of the vacuum switch. This switch is then closed by the vacuum in the casing 105, the contact member 109 bridging the contacts 99 and 102. The circuit therefore continues from the contact 99 of the switch through the switch member 109, the contact 102, and the conductor 104 to the conductor 80 connected with one terminal of the coils of the solenoid. The circuit continues from the other terminal of the coils of the solenoid through the conductors 82, 70 and 74 to the battery.

Therefore, the rapid shift of the controller element 84 from the position shown in Fig. 7 to the position shown in Fig. 5 will result in the energization of the solenoid and the movement of the valve member 40 into its upper position thereby admitting air under atmospheric pressure to the valve casing 24, the conduit 22 and the casing member 10. The spring 16 will therefore shift the rod 6 and lever 5 to connect the low speed mechanism with the rear axle.

It is to be understood that when the motor is driving the vehicle and the rear axle transmission is in one gear ratio and the vacuum operated and controlled mechanism is conditioned to shift said transmission into another gear ratio, the shift is made only upon the release of the driving torque on the gears. This may be done by letting up on the accelerator or by the disengagement of the vehicle clutch. After the shift of the gears, the new gear setting is maintained by the depression of the accelerator to resume the drive.

If desired, a signal light circuit may be provided to indicate when the solenoid circuit through which the solenoid is energized during normal operations, is closed. This signal circuit comprises a conductor 114 connecting the conductor 80 with a lamp socket 115 in which is inserted a lamp 116 and a conductor 117 connecting the lamp socket with the conductor 70. Whenever the circuit including the conductor 80, the solenoid and the conductor 82 is closed the lamp will be energized and when this circuit is open the lamp will be deenergized.

In the system shown in Fig. 9 of the drawings, mechanism is provided for controlling the shift of the change speed transmission of the rear axle in accordance with variations in the degree of vacuum in the engine manifold. The construction shown in Fig. 9 is also devised to prevent the parking of the vehicle with the change speed transmission of the rear axle held in high gear setting by the vacuum actuated and controlled mechanism whether the engine has been stopped by cutting the ignition circuit or by the stalling of the engine. The latter construction embodies mechanism for energizing the solenoid to cause the shift of the transmission into low speed upon the rapid shift of the controller switch member from high speed to ignition cut off position or upon the stalling of the engine with the high speed gearing connected with the rear axle.

The construction shown in Fig. 9 comprises a battery 54, a controller 62, an ignition system 68, conductors for connecting the battery with the controller, the controller with the ignition system and the ignition system with the battery, gear shift mechanism for the transmission, vacuum operated and controlled means for actuating the gear shift mechanism during normal operations, a valve 25 for controlling said vacuum operated and controlled mechanism, connections respectively between said valve and said vacuum operated and controlled mechanism and between said valve and the intake manifold of the engine, a solenoid 50—52 for shifting the valve, circuit connections between the controller and the solenoid and between the solenoid and the battery for energizing and deenergizing the solenoid during normal operations and a check valve in the conduit 38 between the valve 25 and the engine manifold. All of the parts of the construction shown in Fig. 9 above briefly referred to, except as hereinafter described, have substantially the same construction arrangement and mode of operation as the corresponding parts of the construction shown in Fig. 1.

The construction shown in Fig. 9 comprises a vacuum controlled switch 100$^a$ having substantially the same construction and arrangement of parts as the switch 100 shown in Fig. 1. The vacuum chamber of the switch 100$^a$ shown in Fig. 9 is connected with the conduit 22 as is the vacuum chamber of the switch 100 shown in Fig. 1. Corresponding reference numerals with the suffix "*a*" are used to designate the parts of this switch as are used to designate the corresponding parts of the switch 100 shown in Fig. 1. The vacuum chamber of switch 100a is connected by a conduit 112a with the conduit 22 leading from valve 25 to the casing member 10 of the vacuum controlled mechanism for shifting the gears.

The contact 96, the conductor 98, and the conductor 104 of the construction shown in Fig. 1 are all eliminated in the construction shown in Fig. 9.

In the construction shown in Fig. 9, the contact 99a of the switch 100a is connected with the battery by conductors 118 and 119. The contact 102a of the latter switch is connected by a conductor 120 with the contact 122 of a second vacuum controlled switch indicated as a whole at 124. This switch is shown diagrammatically in Fig. 9 and the construction thereof is shown in Fig. 10. The switch is provided with a second contact 126 connected by a conductor 128 with the conductor 80 leading to the coils of the solenoid.

The vacuum controlled switch 124 constitutes, in certain respects, a reversal of the switch 100. The contacts 122 and 126 of the switch 124 are normally disconnected when the engine is running. The switch bridges the contacts 122 and 126 when the vacuum in the conduit 38 leading to the intake manifold falls below a predetermined point.

The contacts 122 and 126 consist of plates made of conducting material such as copper mounted in spaced relation on the upper end of a vacuum chamber or casing. This casing comprises a body 129 preferably conical in form and an annular extension or ring 130 supported upon the upper end of the conical wall of said body and secured thereto by screws 132. The contacts 122 and 126 are mounted upon the upper face of the annular extension 130 and are secured in position by means of screws 134 passing through openings in the contacts and threaded into the extension 130, a separating ring 135 of insulting material being interposed between the contacts and the extension. To insulate the screws 134 from the contacts, suitably shaped separators 136 of insulating material are interposed respectively between the screws and the corresponding contacts.

The switch 124 comprises a movable switch contact 138 located below the contacts 122 and 126 and arranged to be moved upwardly into engagement with said contacts to bridge the same. The contact member 138 is mounted on the upper end of a vertically movable spindle 140 to which is fixed the central portion of a flexible diaphragm 142 of insulating material, the diaphragm engaging in a groove 144 in the spindle. The periphery of the diaphragm is interposed between the upper end of the conical body 128 of the casing and the extension 130 and is clamped in position by the screws 132. The diaphragm is acted upon by a compression spring 146 interposed between the spindle and the lower end of the casing which tends to maintain the switch member 138 in engagement with the contacts 122 and 126. The downward movement of the member 138 is limited by the engagement thereof with an annular flange 148 extending inwardly from the inner wall of extension 130. The lower end of the casing 128 is connected by a conduit 150 with the conduit 38 leading to the intake manifold of the engine.

In the construction shown in Fig. 9, the check valve indicated at 53 is located in the conduit 38 between the conduit 150 leading to the vacuum operated switch 124 and the valve 25.

With the construction shown in Figs. 9 to 13 inclusive, all circuits are dead when the controller 84 is located in the position shown in Fig. 11, the engine then being out of operation. The valve member 40 is then in lowered position, the switch 124 is closed, the switch 100a is open and the gear shift mechanism is in low gear condition. Before starting the engine, the controller 84 preferably is swung into the position shown in Fig. 12, and the starter is then operated to start the engine. The shifting of the controller to the position shown in Fig. 12 connects the ignition circuit and also connects the circuit from the contact 78 through the solenoid 50—52 which operates the valve member 40 to disconnect the vacuum operated mechanism from the engine manifold and to connect said mechanism with the atmosphere through the opening 33 so that the rear axle transmission mechanism remains in low gear.

The controller is then shifted to the position shown in Fig. 13. This breaks the circuit from the contact 78 through the solenoid 50—52 and the valve member 40 is then depressed by gravity thereby cutting off the connection between the valve chamber 24 and the atmosphere and connecting the casing member 10 with the engine manifold. The switch member 138 is then closed and the switch member 109a is in open position and the gear shift mechanism retains its low gear setting.

While the engine is idling, the vehicle being stationary, the vacuum builds up in the engine manifold and in the casing member 10 and since the gears of the gear shift mechanism of the rear axle transmission are not then under torque, the diaphragm 14 is actuated to shift the said transmission into high gear. The vehicle may be driven with the rear axle transmission in high gear provided the load to be driven is relatively low. The two speed rear axle transmission may be shifted into low speed while the engine is idling by moving the switch member 84 from the position shown in Fig. 13 back to the position shown in Fig. 12. With the switch member in the latter position, the solenoid is energized, the vacuum operated mechanism is rendered inoperative and the gear shift mechanism of the transmission is shifted into low speed by the action of the spring 16.

With the switch member 84 in the position shown in Fig. 13 and the gear shift mechanism of the rear axle transmission in high gear setting, the said transmission may be shifted into low speed, while the engine is idling, by depressing the accelerator to reduce the vacuum in the engine manifold 20 and in the conduit 38 to a very low point. The switch member 138 is then closed by the action of spring 146 and the switch member 109a is held in closed position by the vacuum maintained in the valve chamber 100a. A circuit is therefore made which may be traced from the battery through the conductors 119 and 118, switch 100a, conductor 120, switch 124 and conductors 128 and 80 to the coils of solenoid 50—52. From the solenoid, the circuit may be traced through conductors 82, 70 and 74 back to the battery.

The energization of the solenoid operates to move the valve member 40 upwardly to cut off communication between the casing member 10 and the engine manifold and to open communication between said casing member and the atmosphere. The spring 16 then operates to shift the rod 6 and lever 5 to connect the low speed driving mechanism with the rear axle.

When the vehicle is driven with the low speed driving mechanism of the rear axle engaged and with the switch member 84 in the position shown in Fig. 13, the vacuum builds up in the engine manifold until the switch member 138 is moved to open position thereby disconnecting the solenoid circuit of which said switch member is an element and the valve member 40 is then moved to its lower position to reestablish communication between the engine manifold and the casing member 10 and to cut off communication between said casing member and the atmosphere. The diaphragm 14 will then be acted upon by the vacuum in said casing member and this action tends to move said diaphragm to shift the rod 6 and the lever 5 in a direction to connect the high speed driving mechanism with the rear axle. The torque upon the gears of the rear axle transmission mechanism prevents the shift from taking place until the torque is relieved. This may be done by letting up on the accelerator to close at least partially the throttle or by disengaging the vehicle clutch. The vacuum operated mechanism will then shift the rod 6 and lever 5 to connect the high speed driving mechanism with the rear axle. With the switch member 84 in the position shown in Fig. 13, the shift back to low speed drive of the rear axle transmission when the vehicle is running with said transmission in high gear condition may be effected by depressing the accelerator to reduce the vacuum in the engine manifold and in the conduit 38 to a very low point. The switch member 138 will then be closed and the switch member 109ᵃ will be maintained in closed position and a circuit will be made through the solenoid 50—52 to move the valve member 40 to its uppermost position to condition the vacuum operated mechanism to shift the rear axle transmission to connect the low speed driving mechanism with the rear axle. Since the gears of said transmission are then under torque, the shift will not take place until the torque is relieved. This may be done by letting up on the accelerator to close at least partially the throttle or by disengaging momentarily the vehicle clutch.

With the switch lever 84 in the position shown in Fig. 13, the rear axle transmission in high gear setting and the vehicle being driven, the rear axle transmission may be shifted to its low gear setting by shifting the switch 84 to the position shown in Fig. 12. This will energize the solenoid and condition the vacuum operated mechanism to shift the rear axle transmission into its low gear setting. Said mechanism will operate to shift said transmission into its low gear setting upon the release of the torque upon the gears of said transmission.

With the construction shown in Figures 9 to 13 inclusive, whenever the engine is stopped either because of the disconnecting of the ignition circuit by the rapid movement of the movable switch member 84 of the controller from the position shown in Fig. 13 to the position shown in Fig. 11 or by the stalling of the engine, while the high speed gearing of the transmission is connected with the rear axle, the vacuum in the casing of the vacuum controlled switch 124 almost immediately drops to a very low point and the contact 138 is engaged with the contacts 122 and 126. At the same time, the low pressure in the casing of the vacuum controlled switch 100ᵃ is maintained by the action of the check valve 53 and the switch member 109ᵃ is maintained in engagement with the contacts 99ᵃ and 102ᵃ. A circuit is therefore made from the battery through the conductors 119 and 118, the vacuum controlled switch 100ᵃ, the conductor 120, the vacuum controlled switch 124, the conductor 128 and the conductor 80 to one terminal of the coils of the solenoid 50—52. From the other terminal of the coils of the solenoid, the circuit continues through the conductor 82 and conductors 70 and 74 back to the battery.

The energization of the solenoid causes the operation of the valve member 40 to cut off communication of the casing member 10 with the engine manifold and open communication between said casing and the atmosphere. The spring 16 then operates to shift the rod 6 and the lever 5 to connect the low speed driving mechanism with the rear axle.

Having explained the nature and object of the invention and having specifically described constructions embodying the several features of the invention in their preferred forms, what is claimed is:

1. In an automotive vehicle having an internal combustion engine, a driving shaft for the vehicle, and a transmission mechanism for driving the shaft from the engine including high speed driving means and low speed driving means, and a shift mechanism for said transmission; differential fluid pressure operated means for actuating the shift mechanism to connect one of said driving means with the shaft, control mechanism for said shift actuating means, means for conditioning said control mechanism to cause the development of differential fluid pressure in said shift actuating means to actuate the shift mechanism to connect the latter driving means with the shaft, a spring, mechanism actuated by the spring for connecting the other of said driving means with the shaft when the differential pressure condition in said differential fluid pressure operated means is broken, an ignition circuit, means for controlling said circuit, means for conditioning said control mechanism to prevent the development of differential fluid pressure in said shift actuating means when said ignition circuit controlling means is actuated to connect the ignition circuit and means for conditioning said control mechanism to break the differential pressure condition in said shift operating means when said ignition circuit controlling means is operated to disconnect the circuit, whereby the spring operates to connect the latter driving means with the shaft.

2. In an automotive vehicle having an internal combustion engine, a driving shaft for the vehicle, and a transmission mechanism for driving the shaft from the engine including high speed driving means and low speed driving means, and a shift mechanism for said transmission; differential fluid pressure operated means for actuating the shift mechanism to connect one of said driving means with the shaft, control mechanism for said shift actuating means, including a solenoid and a solenoid circuit, means for conditioning said solenoid circuit to cause the development of differential fluid pressure in said shift actuating means to actuate the shift mechanism to connect the latter driving means with the shaft, a spring, mechanism actuated by the spring for connecting the other of said driving means with the shaft when the differential pressure condition in said differential fluid pressure operated means is broken, an ignition circuit, means for controlling said circuit, means for controlling the solenoid circuit to condition said control mechanism to prevent the development of differential fluid pressure in the shift actuating means upon the connection of the ignition circuit, and means for controlling the solenoid circuit to condition said control mechanism to break the differential fluid pressure in said shift actuating means upon the disconnection of said ignition circuit while the first driving means remains in connection with the shaft whereby the spring then operates the shift mechanism to connect the other driving means with the shaft.

3. In an automotive vehicle having an internal combustion engine, a driving shaft for the vehicle, and a transmission mechanism for driving the shaft from the engine including high speed driving means and low speed driving means, and a shift mechanism for said transmission; differential fluid pressure operated means for actuating the shift mechanism to connect one of said driving means with the shaft, a valve for controlling said means, means for conditioning the valve to cause the development of differential fluid pressure in said shift actuating means to actuate the shift mechanism to connect the latter driving means with the shaft, a spring, mechanism actuated by the spring for connecting the other of said driving means with the shaft when the differential pressure condition in said differential fluid pressure operated means is broken, an ignition circuit, means for controlling said circuit, means for controlling the valve to prevent the development of differential fluid pressure in said shift actuating means when the ignition circuit controlling means is operated to connect the circuit, and means for positioning the valve to break the differential pressure condition in said shift actuating means when said ignition circuit controlling means is operated to disconnect the circuit, whereby the spring operates to connect the latter driving means with the shaft.

4. In an automotive vehicle having an internal combustion engine, a driving shaft for the vehicle, and a transmission mechanism for driving the shaft from the engine including high speed driving means and low speed driving means, and a shift mechanism for said transmission; differential fluid pressure operated means for actuating the shift mechanism to connect one of said driving means with the shaft, control mechanism for said shift actuating means, means for conditioning said control mechanism to cause the development of differential fluid pressure in said shift actuating means to connect the latter driving means with the shaft, a spring, mechanism actuated by the spring for connecting the other of said driving means with the shaft when the differential pressure condition in said differential fluid pressure operated means is broken, an ignition circuit, means for controlling said circuit, means for conditioning the said control mechanism to prevent the development of differential fluid pressure in said shift actuating means upon the operation of the ignition circuit controlling means to connect said circuit, and means for conditioning said control mechanism to break the differential fluid pressure condition in said shift actuating means upon the breaking of said ignition circuit by said circuit controlling means while said first driving means remains in connection with the shaft.

5. In an automotive vehicle having an internal combustion engine, a driving shaft for the vehicle, a transmission mechanism for driving the shaft from the engine, including high speed gearing, low speed gearing, and a shift mechanism for the transmission, power operated means for actuating the shift mechanism alternatively to connect the low speed gearing or the high speed gearing with the shaft, control mechanism for said power operated means, an ignition circuit, means for connecting and disconnecting said circuit, means for conditioning said control mechanism for the connection of the low speed gearing with the shaft upon the connection of the ignition circuit and mechanism for conditioning said control mechanism to cause said power operated means to actuate the shift mechanism to connect the low speed gearing with the shaft upon the disconnection of the ignition circuit while the high speed gearing is connected with the shaft.

6. In an automotive vehicle having an internal combustion engine provided with an intake manifold, a driving shaft for the vehicle, a transmission mechanism for driving the shaft from the engine, including high speed gearing, low speed gearing, and a shift mechanism for shifting said gearing; power operated means for actuating the shift mechanism alternatively to connect the low speed gearing or the high speed gearing with the shaft, mechanism for controlling said power operated means, an ignition circuit, means for connecting and disconnecting said circuit, and mechanism responsive to manifold vacuum for operating the control mechanism for said power operated means to cause said power operated means to actuate the shift mechanism to connect the low speed gearing with the shaft upon each stopping of the engine while the high speed gearing is connected with the shaft.

7. In an automotive vehicle having an internal combustion engine, a driving shaft for the vehicle, a transmission mechanism for driving the shaft from the engine, including high speed gearing, low speed gearing and a shift mechanism for shifting the gearing; differential fluid pressure operated and controlled means for actuating the shift mechanism alternatively to connect the low speed gearing or the high speed gearing with the shaft, control mechanism for said shift actuating means, an ignition circuit, means for connecting and disconnecting said circuit, means for conditioning the control mechanism for said shift actuating means for the connection of the low speed gearing with the shaft upon the connection of the ignition circuit and mechanism for conditioning said control mechanism for said shift actuating means to cause said means to actuate the shift mechanism to connect the low speed gearing with the shaft upon the disconnection of the ignition circuit while the high speed gearing is connected with the shaft.

8. In an automotive vehicle having an internal combustion engine, a driving shaft for the vehicle, a transmission mechanism for driving the shaft from the engine, including high speed gearing, low speed gearing and a shift mechanism for said gearing; power operated means for actuating the shift mechanism alternatively to connect the low speed gearing or the high speed gearing with the shaft, control mechanism for said power operated means, an ignition circuit, a unitary controller constructed and arranged to connect the ignition circuit and to condition said control mechanism to cause said power operated means to operate the shift mechanism to connect the low speed gearing with the shaft, and then to maintain the ignition circuit and condition said control mechanism to cause the shift actuating mechanism to connect the high speed gearing with the shaft.

9. In an automotive vehicle having an internal combustion engine, a driving shaft for the vehicle, a transmission mechanism for driving the shaft from the engine, including high speed gearing, low speed gearing and a gear shift mechanism; power operated means for actuating the gear shift mechanism alternatively to connect the low speed gearing or the high speed gearing with the shaft, mechanism for controlling said power operated means, an ignition circuit, a controller operable during its movement in one direction to connect the ignition circuit and to cause the actuation of said controlling mechanism for said power operated means to operate the gear shift mechanism to connect the low speed gearing with the shaft, and then to maintain the ignition and cause the actuation of said controlling mechanism to operate the shift mechanism to connect the high speed gearing with the shaft.

10. In an automotive vehicle having an internal combustion engine, a driving shaft for the vehicle, a transmission mechanism for driving the shaft from the engine, including high speed gearing, low speed gearing and a gear shift mechanism; power operated means for actuating the gear shift mechanism alternatively to connect the low speed gearing or the high speed gearing with the shaft, mechanism for controlling said power operated means, an ignition circuit, a controller operable to connect the ignition circuit and to cause the actuation of said controlling mechanism for said power operated means to operate the shift mechanism to connect the low speed gearing with the shaft, and then to maintain the ignition and cause the actuation of said controlling mechanism to connect the high speed gearing with the shaft and thereafter to disconnect said ignition circuit.

11. In an automatic vehicle having an internal combustion engine, a driving shaft for the vehicle, a transmission mechanism for driving the shaft from the engine, including high speed gearing, low speed gearing and a shift mechanism for said gearing; power operated means for actuating the shift mechanism alternatively to connect the low speed gearing or the high speed gearing with the shaft, mechanism for controlling said power operated means, an ignition circuit, a controller constructed and arranged to connect the ignition circuit and to cause the actuation of said controlling mechanism for said power operated means to connect the low speed gearing with the shaft, and then to maintain the ignition circuit and cause the actuation of said controlling mechanism to connect the high speed gearing with the shaft during the movement of the controller in one direction and to disconnect the ignition circuit during the movement of the controller in the opposite direction.

12. In an automotive vehicle having an internal combustion engine, a driving shaft for the vehicle, a transmission mechanism for driving the shaft from the engine, including high speed gearing, low speed gearing and a gear shift mechanism; power operated means for actuating the shift mechanism alternatively to connect the low speed gearing or the high speed gearing with the shaft, mechanism for controlling said power operated means, an ignition circuit, a controller constructed and arranged to connect the ignition circuit and to cause the actuation of said controlling mechanism for said power operated means to connect the low speed gearing with the shaft, and then to maintain the ignition circuit and cause the actuation of said controlling mechanism to operate the shift mechanism to connect the high speed gearing with the shaft during the movement of the controller in one direction, and to maintain the ignition circuit and to cause the actuation of said controlling mechanism to connect the low speed gearing with the shaft and finally to disconnect the ignition circuit during the movement of the controller in the opposite direction.

13. In an automotive vehicle having an internal combustion engine provided with an intake manifold, a driving shaft for the vehicle, a transmission mechanism for driving the shaft from the engine including high speed gearing, low speed gearing and a shift mechanism for said transmission; vacuum operated means for operating the shift mechanism to connect the high speed gearing with the shaft, means for connecting said vacuum operated mechanism with the intake manifold, a valve for controlling the vacuum in said mechanism, a spring for operating the shift mechanism to connect the low speed mechanism with the shaft when the vacuum operated mechanism is rendered inoperative, an ignition circuit, means for connecting and disconnecting said circuit, means for conditioning said valve to render said vacuum operated mechanism inoperative upon the connection of the ignition circuit, and means for conditioning said valve to render the vacuum operated mechanism inoperative upon the disconnection of the ignition circuit while said high speed gearing is connected with the shaft, whereby said spring operates the shift mechanism to shift the low speed gearing into connection with the shaft.

14. In an automotive vehicle having an internal combustion engine provided with an intake manifold, a driving shaft for the vehicle, a transmission mechanism for driving the shaft from the engine including high speed gearing, low speed gearing and a shift mechanism for said transmission; vacuum operated means for operating the shift mechanism to connect the high speed gearing with the shaft, means for connecting said vacuum operated mechanism with the intake manifold, a valve for controlling the vacuum in said mechanism, a spring for operating the shift mechanism to connect the low speed mechanism with the shaft when the vacuum operated mechanism is rendered inoperative, an ignition circuit, means for connecting and disconnecting said circuit, and means responsive to manifold vacuum for operating said valve to render said vacuum operated mechanism inoperative upon each stoppage of the engine while said high speed gearing is connected with the shaft, whereby said spring operates the shift mechanism to shift the low speed gearing into connection with the shaft.

15. In an automotive vehicle having an internal combustion engine, a driving shaft for the vehicle, a transmission mechanism for driving the shaft from the engine, including high speed gearing, low speed gearing, and a shift mechanism for the transmission, power operated means for actuating the shift mechanism alternatively to connect the low speed gearing or the high speed gearing with the shaft, a controller having two engine running positions and a third position, means for connecting the ignition circuit when said controller is moved to one of said engine running positions, means for maintaining the ignition circuit when said controller is moved to the other of said engine running positions, means for conditioning the control mechanism for said power operated means to cause said means to connect the low speed mechanism with the shaft when said controller is moved to the first engine running position, means for conditioning said control mechanism to cause said power operated means to connect the high speed mechanism with the shaft when the controller is moved to the second engine running position and means for disconnecting the ignition circuit and conditioning the control mechanism to cause said power operated means to connect the low speed mechanism with the shaft when said controller is moved to the third position.

16. A control system for use in a motor vehicle having an engine provided with an inlet manifold, an ignition circuit, a transmission having high and low gear ratios, and shift mechanism for shifting said transmission from one gear ratio to another, comprising a power unit having differential pressure operated means connected with said shift mechanism, a valve controlling the application of pressure differential to said means, a solenoid for operating said valve to cause said mechanism to shift said transmission into one gear when said solenoid is energized and into the other gear when de-energized, a solenoid circuit including a circuit controlling switch, a switch actuating member connected to said manifold and operable to open and close said solenoid circuit in accordance with the degree of vacuum in said manifold, an ignition circuit controller, and switch means operated thereby to selectively close said ignition circuit and said second solenoid circuit, or close said ignition circuit without closing said second solenoid circuit, said switch means including a manually operable switch in said second circuit for manually controlling said solenoid independently of manifold vacuum.

17. A control system for use in a motor vehicle having an engine provided with an inlet manifold, a transmission having high and low gear ratios, and shift mechanism for shifting the transmission from one gear ratio to another, comprising a power unit having differential pressure operated means connected to said shift mechanism, a valve controlling the application of pressure differential to said means, a solenoid operating said valve to cause said mechanism to shift said transmission into one gear when said solenoid is energized and into the other gear when deenergized, a solenoid circuit including a circuit controlling switch and a switch actuating member connected to said manifold and operable to open and close said solenoid circuit in accordance with the degree of vacuum in said manifold, a second switch in said circuit and a switch actuating member responsive to pressure conditions in said power unit operable to open and close said solenoid circuit in accordance with said pressure conditions, a second solenoid circuit, and means manually controlling said second circuit whereby to energize and de-energize said solenoid independently of manifold vacuum.

18. A control system for use in a motor vehicle having an engine provided with an inlet manifold, a transmission having high and low gear ratios, and shift mechanism for shifting the transmission from one gear ratio to another, comprising a power unit having differential pressure operated means connected to said shift mechanism, a valve controlling the application of pressure differential to said means, a solenoid operating said valve to cause said mechanism to shift said transmission into one gear when said solenoid is energized and into the other gear when de-energized, a solenoid circuit including a circuit controlling switch and a switch actuating member connected to said manifold and operable to open said circuit when manifold vacuum is effective and close said circuit when manifold vacuum is broken, a second switch in said circuit and a switch actuating member responsive to pressure conditions in said power unit operable to close said circuit when vacuum is effective in said power unit and open said circuit when vacuum in said power unit is broken, a second solenoid circuit, and means manually controlling said second circuit whereby to energize and de-energize said solenoid independently of manifold vacuum.

19. A control system for use in a motor vehicle having an engine provided with an intake manifold, a multi-speed transmission including high and low gear ratios and gear shifting mechanism for said transmission, comprising a power mechanism for selectively shifting said transmission into one or the other of said gear ratios including a differential pressure operated member connected to said mechanism, a control valve connected to said manifold and controlling the application of vacuum to said member, mechanism for operating said valve including a solenoid having a valve actuating armature, a solenoid circuit including a manually operated switch, and a second solenoid circuit including a vacuum controlled switch responsive to manifold vacuum to energize and de-energize said solenoid in accordance with variations in manifold vacuum, and a second switch in said second circuit responsive to vacuum applied to said power unit to open and close said circuit in accordance with the operation of said power unit.

20. A control system for use in a motor vehicle having an engine provided with an inlet manifold, a multi-speed transmission including high and low gear ratios, and gear shift mechanism for said transmission, comprising a power mechanism for selectively shifting said transmission into one or the other of said gear ratios including a differential pressure-operated member connected to said shift mechanism, a control valve connected to said manifold and controlling the application of pressure differential to said member, and mechanism automatically controlled by the degree of vacuum in the manifold for operating automatically said valve to apply a pressure differential to said member to shift said transmission into one gear ratio when the manifold vacuum rises above a determinate amount, and for operating the valve to vary the pressure differential on said member to shift said mechanism into another gear ratio when said vacuum falls below a determinate amount.

21. A control system for use in a motor vehicle having an internal combustion engine provided with an inlet manifold, a multi-speed transmission including high and low gear ratios and gear shifting mechanism for said transmission, comprising a power mechanism connected with the manifold for shifting said transmission from one gear ratio to another including a pressure differential operated member connected to said shift mechanism, a control valve for regulating the application of pressure differential to said member, said valve being movable between one position in which the action of the valve causes the subjection of said member to a differential pressure to shift said transmission into high gear and a second position in which the action of the valve causes the subjection of said member to another differential pressure to shift said transmission into low gear, and mechanism automatically controlled by the degree of vacuum in the manifold for automatically moving the valve from the second to the first position when the degree of vacuum in the manifold rises above a predetermined amount and for automatically moving the valve from the first to the second position when the degree of vacuum in the manifold falls below a predetermined amount.

22. A control system for use in a motor vehicle having an internal combustion engine provided with an inlet manifold, a two-speed axle transmission including high and low gear ratios and shift mechanism for said transmission, of mechanism for selectively shifting said transmission into one or another of said gear ratios including a power unit having a vacuum actuated member connected to said shift mechanism for shifting said transmission into high gear ratio, spring means for causing said member to shift said transmission into low gear ratio when the vacuum is rendered ineffective, means connecting said manifold with said member for applying vacuum to said member including a vented control valve and vacuum responsive mechanism connected to said manifold for operating said valve to apply a pressure differential to said means to shift said transmission into one gear ratio when the manifold vacuum rises above a determinate amount and to vary the pressure differential on said means to shift said transmission into another gear ratio when said vacuum falls below said determinate amount.

23. A transmission actuating and controlling mechanism for a motor vehicle having an engine provided with an intake manifold, a variable speed transmission and gear shift mechanism for said transmission, power operated mechanism for shifting said transmission selectively into different speeds and means controlled by manifold vacuum for conditioning automatically said power operated mechanism to shift the transmission into one of said speeds when the vacuum in the manifold rises above a predetermined amount and for conditioning automatically said power operated mechanism to shift the transmission into another of said speeds when the vacuum in the manifold falls below a predetermined amount.

24. A control system for use in a motor vehicle having an engine provided with an inlet manifold, a multispeed transmission including high and low gear ratios and gear shift mechanism for said transmission, comprising a power mechanism for selectively shifting said transmission into one or another of said gear ratios including a power unit having a differential pressure operated means connected to said shift mechanism, a valve member controlling the application of pressure differential to said means, mechanism for operating said valve, vacuum responsive devices connected with the manifold for controlling said operating mechanism to apply a pressure differential to cause said pressure operated means to shift said transmission into one gear ratio when the manifold vacuum rises above a predeterminate amount and to vary the pressure differential on said pressure operated means to cause the same to shift said transmission into another gear ratio when said vacuum is less than said predeterminate amount, said devices constituting the sole means for controlling automatically the valve.

25. A control system for use in a motor vehicle having an internal combustion engine provided with an inlet manifold, a two-speed axle transmission including high and low gear ratios and shift mechanism for said transmission, of mechanism for selectively shifting automatically said transmission into one or another of said gear ratios during the running of the engine including a power unit having a vacuum actuated member connected to said shift mechanism for shifting said transmission into high gear ratio, spring means for causing said member to shift said transmission into low gear ratio when the vacuum is rendered ineffective, means connecting said manifold with said member for applying vacuum to said member including a vented control valve, mechanism for operating said valve, vacuum responsive means connected to the manifold for controlling said operating mechanism during the running of the engine to apply a pressure differential to said means to shift said transmission into one gear ratio when the manifold vacuum is above a predeterminate amount and to vary the pressure differential on said means to shift said transmission into another gear ratio when said vacuum is less than said predeterminate amount.

26. A control system for use in a motor vehicle having an internal combustion engine provided with an inlet manifold, a two-speed axle transmission including high and low gear ratios, and shift mechanism for said transmission, of mechanism for selectively shifting said transmission into one or another of said gear ratios including a power unit having a vacuum controlled member connected to said shift mechanism for shifting said transmission into high gear ratio, spring means for causing said member to shift said transmission into low gear ratio when the vacuum on said member is rendered ineffective, means connecting said manifold with said member for applying vacuum to said member including a vented control valve, means for operating said valve to apply vacuum to said member to shift said transmission into high gear ratio, and vacuum responsive means for rendering inoperative said valve operating means while said engine is delivering power whereby to break the application of vacuum to said member and cause said spring to shift said transmission into low gear ratio.

References Cited in the file of this patent

UNITED STATES PATENTS

| | | |
|---|---|---|
| 2,257,674 | Dunn | Sept. 30, 1941 |
| 2,281,916 | Claytor | May 5, 1942 |
| 2,506,105 | Price | May 2, 1950 |
| 2,568,958 | Hey et al. | Sept. 25, 1951 |